United States Patent [19]

Stark

[11] Patent Number: 4,707,055
[45] Date of Patent: Nov. 17, 1987

[54] SCANNING APPARATUS

[75] Inventor: Richard A. Stark, Rochester, N.Y.

[73] Assignee: Eastman Kodak Company, Rochester, N.Y.

[21] Appl. No.: 848,427

[22] Filed: Apr. 4, 1986

[51] Int. Cl.[4] .......................... G02B 26/10; G02B 5/04
[52] U.S. Cl. .................................... 350/3.71; 350/424
[58] Field of Search ............ 350/287, 421, 286, 3.71, 350/424

[56] References Cited

U.S. PATENT DOCUMENTS

| 2,780,140 | 2/1957 | Luboshez | 350/424 |
| 3,640,600 | 2/1972 | Isobe | 350/287 |
| 3,788,733 | 1/1974 | Breglia et al. | 350/287 |

Primary Examiner—John K. Corbin
Assistant Examiner—Martin Lerner
Attorney, Agent, or Firm—John B. Turner

[57] ABSTRACT

A scanner including a source of coherent radiation, a radial hologon, a $f\theta$ lens and a target. Between the light source and the hologon there are means for forming radiation from the source into a collimated beam having an oblong cross-sectional shape and for directing the beam onto the hologon at a predetermined incident angle and with the long axis of the oblong cross sectional shape of the beam radial of the axis of rotation of the hologon. Two prisms are provided between the hologon and the lens means for so modifying the cross-sectional shape of the beam that the spot at the target station has a selected shape and orientation. The prisms are mounted in an articulated mount having adjustment means, which allows rotation of the prisms to as to correct both bow in the scan line and incorrect placement of the scan line on the target. Such bow and incorrect placement could be created by a change of the wavelength of the radiation and by the pitch of the grating lines of the hologon being different to nominal.

3 Claims, 14 Drawing Figures

SCANNING APPARATUS

CROSS REFERENCE TO RELATED APPLICATIONS

Reference is made to commonly assigned, copending patent application Ser. No. 848,426, filed simultaneously herewith in the names of Badhri Narayan, James Edward Roddy, Richard Alan Stark and Dennis Allen Thompson and entitled SCANNING APPARATUS the disclosure of which is specifically incorporated herein by reference.

BACKGROUND OF THE INVENTION

Field of the Invention

This invention relates to scanners for creating successive sweeps of a spot of electromagnetic radiation along the same linear scan path at high frequency. Either the target at which the beam is directed is moved in a direction perpendicular to the linear scan path or the scanned beam is moved in such perpendicular direction, in order to create a raster.

U.S. patent application Ser. No. 848,426 filed on the same day as the present application in the names of Badhri Narayan, James Edward Roddy, Richard Alan Stark and Dennis Allen Thompson, describes scanning apparatus for providing a substantially straight line scan of a light spot with a selected shape. The apparatus therein described includes a source of coherent radiation, a radial hologon mounted for rotation about an axis and means for forming radiation from the source into a collimated beam having an oblong cross-sectional shape and for directing the beam onto the hologon at a predetermined incident angle and with the long axis of the oblong cross-sectional shape of the beam, where the beam is incident on the hologon, being radial of the axis of rotation of the hologon. As is known, a hologon is a diffractive device usually including a plurality of facets with each facet containing a diffraction grating. A radial hologon is one in which the lines of the grating are parallel to a radius bisecting the facet. The radial hologon is adapted to scan the beam upon rotation of the hologon about its axis.

The scanning apparatus described in the aforesaid copending patent application also includes a target station for receiving the scanned beam. There is lens means between the hologon and the target station for focusing the beam to a spot at the target station. Prismatic means are provided between the hologon and the lens means for so modifying the cross-sectional shape of the beam that the spot at the target station has the selected shape. The grating factor ( $$\frac{n\lambda}{d},$$

wherein n is the order of the diffracted beam, $\lambda$ is the wavelength of the light and d is the grating pitch, i.e.

$$\frac{1}{f}$$

wherein f is the number of grating lines per mm) of the hologon is selected to produce a bow in the scanned beam between the hologon and the prismatic means approximately equal and opposite to the bowing tendency imposed by the prismatic means on the scanned beam whereby the scan line at the target station is substantially straight.

Such a scanning apparatus overcomes the problem that there are many conflicting demands on the shape and area of the beam at different locations along its length, for maximization of the performance of different aspects of the apparatus. For example, for maximum duty cycle of the hologon it is desirable that the beam, where incident on the hologon, be chordally narrow. However, for a small spot on the target it is desirable that the beam, where incident on the hologon, be large. It is often desirable that the shape of the spot on the target be non-circular, it being larger in a direction transverse to the scan direction than in the scan direction. However, this shape is not compatible with the desired shape of the beam on the hologon.

The scanning apparatus described in the aforesaid copending patent application overcomes the problem by the inclusion of prismatic means between the hologon and the lens means. The prismatic means change the shape of the beam. However, the prismatic means tends to introduce a bow into the scan line. To overcome that problem the grating factor of the hologon is selected to produce a compensating bow.

It is known that if a beam of electromagnetic radiation, e.g. infrared light, is incident on a diffraction grating at angle $\theta_i$ then the angle $\theta_d$ of the diffracted beam is related by:

$$\sin \theta_i + \sin \theta_d = \frac{n\lambda}{d}$$

where
n is the order of the diffracted beam
$\lambda$ is the wavelength of the radiation
d is pitch of the grating (i.e., $$\frac{1}{f}$$

wherein f is the number of lines per mm)

As is known and as can be seen from the above relationship $\theta_d$ is a function of wavelength and of pitch. Thus, if the wavelength of the radiation should change, so will the angle of the diffracted beam. Also, if the grating pitch should change, so will the angle of the diffracted beam. If the angle of the diffracted beam changes so will the location of the scan line on the target.

When a scanning system is being designed, values of certain parameters are selected but such values may not be exactly achieved when the system is constructed. For example, if the radiation source is a laser diode the wavelength of the radiation it emits may not be exactly that specified. Also, the pitch of the lines in the hologon may not be exactly as specified. Further, a replacement laser diode, even of nominally the same wavelength as its predecessor in the system, may emit at a wavelength different to its predecessor. Thus, a specified $\theta_d$ may be difficult to achieve initially and after replacement of a laser diode.

A departure of $\theta_d$ from its design value causes the beam to scan a line displaced from the designed location of the scan line and may have further ramifications in that the beam does not have the intended path through any optical elements between the hologon and the target.

A discrepancy from the specified value of the wavelength of the radiation and/or of the grating pitch also has an effect on the straightness of the path of the scanning beam. The path of the scanning beam is defined by $$\theta_y = \tan^{-1} \frac{E}{CD + AB}$$

$$\theta_x = \tan^{-1} \frac{CB - DA}{CD + AB}$$

wherein $\theta_y$ is the inclination of the output beam to the path of the output beam when the input beam is incident on the middle of a facet of the hologon $\theta_x$ is the displacement of the output beam from a rectilinear path $A = [\cos^2\gamma - G^2 + 2G \sin \gamma \cos \phi]^{\frac{1}{2}}$
$B = [\cos^2\gamma - G^2 + 2G \sin \gamma]^{\frac{1}{2}}$
$C = \sin \gamma G \cos \phi$
$D = \sin \gamma G$
$E = G \sin \phi$ $G = \frac{n\lambda}{d}$ (the grating factor) $= \sin \theta_i + \sin \theta_d$ $\phi$ = hologon rotation angle (i.e. angular displacement of the hologon from a position in which the beam is incident at the middle of a facet)
$\gamma$ = incident angle of beam on hologon
$\lambda$ = wavelength of radiation
d = grating pitch (i.e.

$$\frac{1}{f}$$

wherein f is the number of lines per mm)
Thus, both $\theta_y$ and $\theta_x$ are functions of wavelength and grating pitch.

It is an object of the present invention to provide a capability to compensate for longterm departure of grating factor, whether by virtue of wavelength or grating pitch, from a specified value. Longterm does not include, for example, the transitional effect on the grating factor by virtue of wavelength shift which occurs with internal modulation of a laser diode or facet-to-facet differences in grating pitch.

According to the present invention, prismatic means between a hologon and a lens for focusing the scanning beam to a spot at a target station comprises first and second prisms mounted in an articulated mount. The first and second prisms are so disposed that the scanning beam passes through them in succession and their apexes are perpendicular to a plane containing the input and output beams at mid scan. The articulated mount includes first and second pivots associated with the first and second prisms, respectively. The axes of the pivots are parallel to the apexes of the prisms. Each pivot allows pivoting movement of its associated prism about the axis of the pivot. There are first means for adjusting the orientation of the first prism about the first pivot axis to adjust the shape of the scanning line. There are second means for adjusting the orientation of the second prism about the second axis for adjusting the position of the scan line on the target.

Such an arrangement has the advantage that defects in the performance of the system, namely bow in the scan line and the scan line being displaced from its desired location, due to the wavelength and/or grating factor being other than nominal, can be readily corrected.

When the first prism is rotated about the first pivot axis, the location of the line of incidence of the scanning line on the second prism moves. Thus, it would be necessary to make the second prism bigger than is necessary to accommodate a scan line in one particular location, if the scan line may have many locations depending on the orientation of the first prism. Prisms of the quality necessary for use in a scanner system are expensive and their price increases with size. Thus, it is desirable, from the cost standpoint, to keep the second prism small. Also, the distance between the hologon and the lens means should be kept to a minimum in order to keep the size of the lens means to a minimum. For this reason also, it is desirable to keep the size of the second prism small.

In an advantageous embodiment, the articulated mount provides translational movement of the second prism in conjunction with rotational motion of the first prism whereby the location of the line of incidence of the scanning beam on the second prism remains approximately constant. In that the line of incidence of the scanning beam on the second prism does not move markedly upon change in the angle between the input and output beams at the first prism, the size of the second prism may be kept small with consequential cost savings in both the lens means and the second prism.

BRIEF DESCRIPTION OF THE DRAWINGS

A preferred embodiment of the present invention will now be described, by way of example, with reference to the accompanying drawings, in which.

Figure 1:
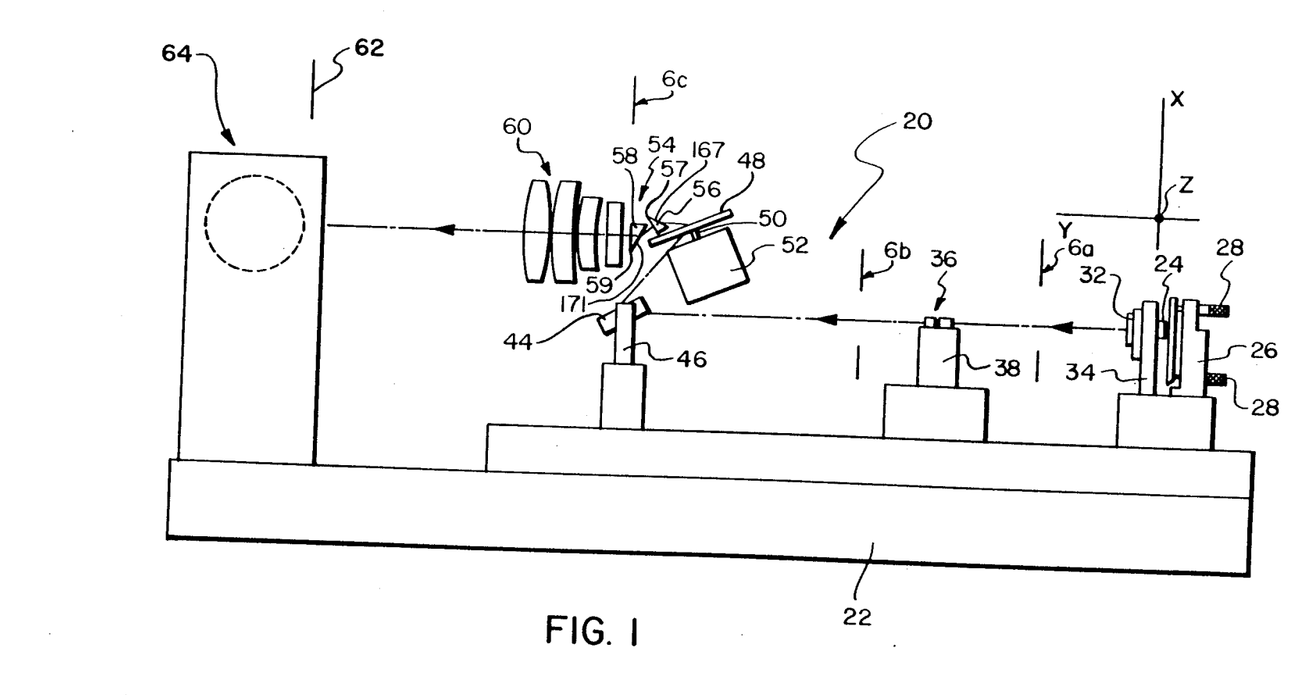
FIG. 1 is a schematic representation of a side elevation of scanning apparatus, in accordance with the present invention, for writing an image on film for the sake of overall understanding of the apparatus, the articulated mount for the prisms between the hologon and the lens means, being omitted.

In order to assist the understanding of the ensuing description, orthogonal X, Y and Z axes are oriented as shown in FIG. 1. Thus, the plane of FIG. 1 is in the XY plane. The overall direction of the light beam is in the Y direction. An indication of the orientation of the X, Y, Z axes is included in most of the figures of the drawings to aid in the understanding of the orientation of the components illustrated in each figure.

The scanning apparatus 20 illustrated in FIG. 1 includes a rigid base 22, extensive in the Y direction and having its surface parallel to the XY plane, on which all of the optical components are mounted so that unwanted relative motion of the components is avoided.

Figure 2:
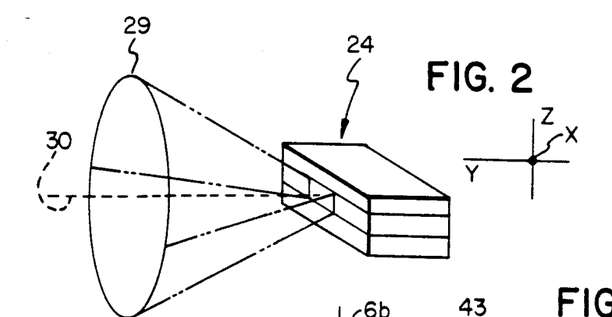
FIG. 2 is a schematic perspective view of a laser diode included in the apparatus illustrated in FIG. 1 with the beam produced by the diode represented.

The apparatus 20 includes a source of coherent light, in this embodiment a laser diode 24, carried by a mount 26. Vernier adjustment devices 28 enable the inclination of the axis 30 of the output beam 29 to the Y axis to be adjusted (see FIG. 2). The diode 24 is so mounted as to direct its output beam 29 to the left, as seen in FIG. 1, in the Y direction.

Modulating means are provided for modulating the output of the laser diode 24 in accordance with information contained in a stream of electronic signals. Such modulating means are well known and are neither illustrated in the accompanying drawings nor described further herein.

Figure 6A:
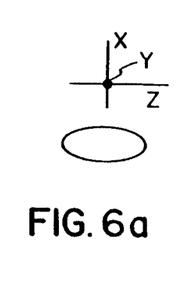
FIGS. 6a, b, c, and d represent the cross-sectional shape of the beam at various locations in the apparatus illustrated in FIG. 1.

The cross-sectional shapes and angles of divergence in orthogonal directions of the beams emitted by different laser diodes vary. In the present embodiment, the diode 24 produces a divergent beam 29 (see FIG. 2) which has an eliptical cross-section, the dimension in the Z direction being greater than that in the X direction. The beam 29 is incident on a collimating lens system 32 which is carried by a mount 34 extending from the base 22. The lens system 32 collimates the light beam but does not alter its cross-sectional shape. Thus, the beam leaving the lens system has at, for example, XZ plane 6a in FIG. 1, a cross sectional shape as illustrated in FIG. 6a.

Figure 3:
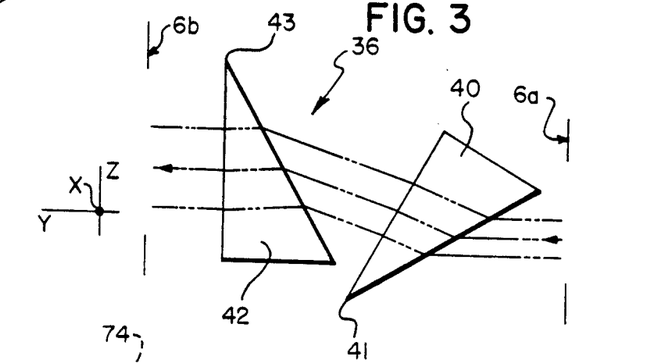
FIG. 3 illustrates prismatic means included ahead of the hologon in the apparatus illustrated in FIG. 1.

The ratio of the major and minor axes of the cross sectional shape of the beam at 6a is not as great as is desired for the beam when incident on the hologon. In other embodiments the beam might have the desired shape; however, in the present embodiment it does not. Therefore, anamorphic beam expansion means, in the present example, prismatic means 36, are disposed in the path of the beam after the collimating lens system 32. The prismatic means 36 are supported from the base 22 by a mount 38. In the present embodiment, the prismatic means 36 includes two prisms (see also FIG. 3) disposed with the apexes 41, 43 of their wedge angles parallel to the X axis. In this disposition the prisms refract only in the YZ plane. The prisms 40, 42 are so disposed as to enlarge the dimension of the beam in the Z direction and to transmit it onwards parallel to the incident beam, i.e. in the Y direction, as can be seen in FIG. 3.

An advantage of having two prisms instead of one is that the desired anamorphic beam expansion can be achieved with the output beam substantially parallel to the incident beam.

The collimating lens system 32 and the anamorphic beam expansion means together form means for forming light from the source into a collimated beam having an oblong cross-sectional shape.

Instead of prismatic means, a cylindrical lens system could be used as the anamorphic beam expansion means.

Figure 6B:
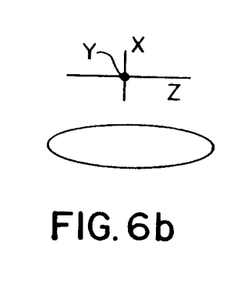

The beam emerging from the prismatic means 36 has (at plane 6b in FIG. 1) a cross-sectional shape as seen in FIG. 6b. The dimension in the X direction is the same as that of the beam incident on the prismatic means 36 but the dimension in the Z direction has been increased.

The beam is next incident on a diffraction grating 44 supported by a mount 46 extending from the base 22. The plane of the diffraction grating is parallel to the plane of the hologon to be described. The grating lines are parallel to the Z axis. The diffraction grating 44 has the same characteristics as those of each facet of the hologon. The purpose of the diffraction grating will be described below. An effect of the grating 44 on the beam is to fold it with its axis remaining in the XY plane. The cross-sectional shape of the beam after diffraction by the grating remains as shown in FIG. 6b.

The beam is next incident on a hologon 48 carried by the shaft 50 of a motor 52. The motor 52 is supported from the base 22 by a support (not shown). The effect of the hologon on the beam will be described in detail below. It will suffice, at present, to say that the hologon diffracts the beam so that it again travels with a major component in the Y direction but when the hologon is rotated it causes the beam to scan, i.e., it gives it a sweeping component in the Z direction.

Figure 5:
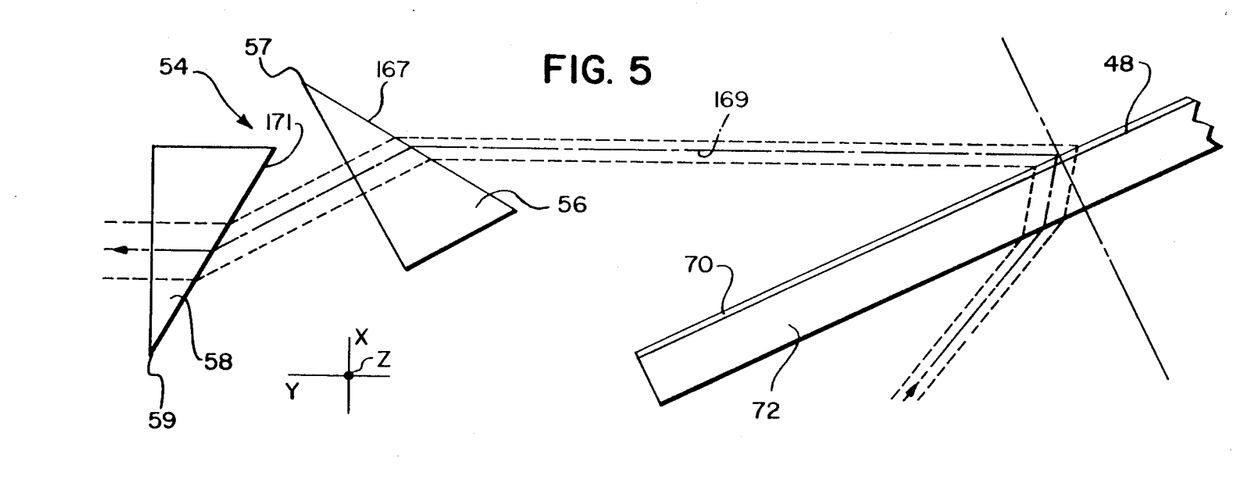
FIG. 5 illustrates further prismatic means and a portion of the hologon included in the apparatus, and the ray path through the hologon and the further prismatic means, the articulated mount for the prismatic means being omitted in this Figure, for the purpose of facilitating understanding of the ray path.
Figure 6C:
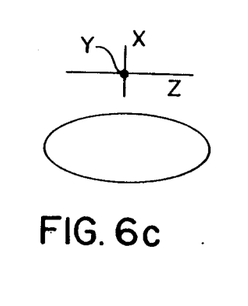

The beam is next incident on second prismatic means 54, which is supported from the base 22 by an articulated mount 101 illustrated in FIGS. 8 to 11. The mount is omitted from FIGS. 1 and 5 to facilitate understanding of the ray path. The prismatic means 54 includes two prisms 56,58 (see FIG. 5) disposed with the apexes (57, 59) of their wedge angles parallel to the Z axis. The prisms 56, 58 are so disposed as to increase the dimension of the beam in the X direction. They do not affect the dimension in the Z direction, but the ratio of the dimensions is changed. The beam, after leaving the prism 58, has a shape (at YZ plane 6c) as illustrated in FIG. 6c and is directed generally parallel to the Y axis. The articulated mount 101 allows the prisms 56, 58 to be moved in desired manner as will be described below.

Figure 6D:
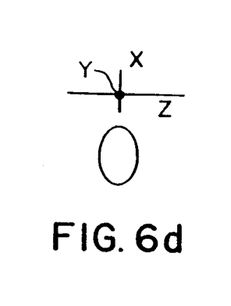

The scanning beam is incident upon a lens system 60 which serves to focus it onto a target in a plane 62 at a target station 64 which is mounted on the base 22. The beam impinges on the target in the form of a spot having a shape as illustrated in FIG. 6d in which the major dimension is now parallel to the X axis. The reversal of the relative magnitudes of the dimensions in the X and Z directions is caused by the focusing lens 60.

The form of the target is not material to an understanding of the present invention. It may be of sheet form or of continuous web form. It is sensitive to the energy in the radiation from the laser so that some form of image is formed on it. The image may be, for example, electrostatic or exposed silver halide. In this embodiment, the light-sensitive material is moved in the X direction, i.e., perpendicular to the scan direction (the Z direction) at a controlled rate to create a raster pattern. In other embodiments, the target material is kept stationary and the beam is deflected also in the direction perpendicular to the scan direction, as by a mirror whose inclination to the incident beam is changed in known manner.

It is known that when a laser diode is pulsed, the wavelength of its emitted radiation drifts and jumps. Such changes in wavelength may be termed short term. If the incident angle of the beam on the hologon 48 is constant, variations in the wavelength will cause variations in the angle of the diffracted beam. This causes artifacts in an image being written by the beam. The diffraction grating 44 upstream of the hologon avoids the undesirable effects of wavelength changes. In essence, when the wavelength changes, the grating 44 causes the angle of incidence on the hologon 48 to change such that with the changed wavelength the diffracted angle remains constant.

The above description is intended to give a general understanding of the scanner, as a whole. The ensueing description will go into greater detail.

Figure 4:
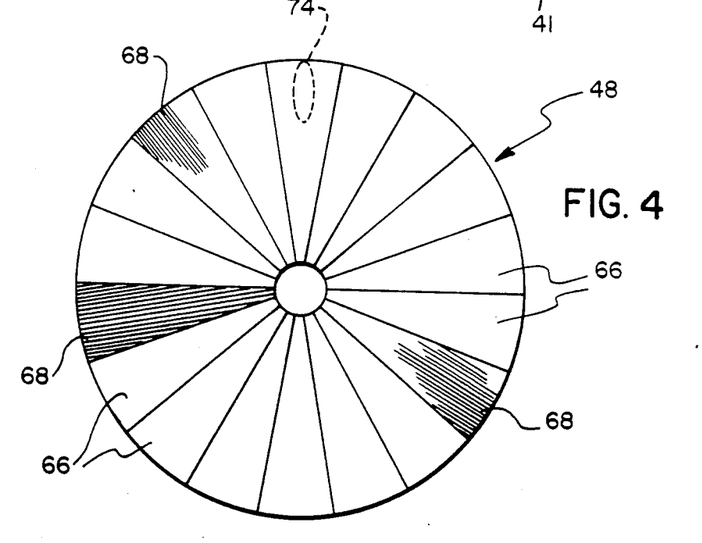
FIG. 4 illustrates a radial hologon included in the apparatus illustrated in FIG. 1.

The hologon 48 is a multi-facet hologon, as may be seen in FIG. 4. In the present example, there are eighteen identical facets 66. Each facet 66 contains a diffraction grating 68. The lines of the grating in each facet are parallel to the radius which bisects the facet. While some grating pattern lines are shown in FIG. 4, it will be recognized that they are both incomplete and merely representative. The actual number of lines per mm is 2162, in the present embodiment wherein the wavelength of the electromagnetic radiation emitted by the laser diode is $0-830 \times 10^{-3}$ mm. The diffraction gratings 68 are formed in a photographic layer 70 carried by a transparent glass support 72.

A broken line ellipse 74 represents the shape and orientation of the beam as it is incident on the hologon 48. It will be observed that the beam is incident contiguous with the periphery of the disk. This maximizes the duty cycle because the ratio of the chordal dimension of the facet measured through the ellipse 74 to the dimension of the ellipse in the same chordal sense, is a maximum if the ellipse is as radially far out as possible.

The ellipse 74 is shown in the middle of a facet 66 and in this disposition its major axis is parallel to the grating lines in the facet. In this disposition, the diffracted beam is parallel to the Y axis and has no component in the Z axis. As the hologon 48 rotates, from the position illustrated in FIG. 4, the grating lines become progressively inclined to the major axis of the ellipse. This progressive inclination causes the diffracted beam to have a progressively increasing component in the Z direction. Assuming that the beam is incident on the hologon behind the shaft 50 (as seen in FIG. 1) and the hologon is rotated clockwise as seen in FIG. 4 and as looked down upon from above in FIG. 1, the beam will have a Z axis component directed into the plane of the paper bearing FIG. 1. As the hologon continues to rotate, that Z axis component will increase. Eventually, a portion of the beam will be incident on the next adjacent facet and that portion of the beam will be diffracted with a maximum Z axis component directed out of the paper bearing FIG. 1 and, at the same time, the portion of the beam still on the previous facet has a maximum component in the Z direction into the paper. Continued rotation of the hologon causes the portion of the beam on the previous facet to diminish to zero. Such continued rotation also causes the Z axis component out of the paper to diminish eventually to zero (i.e., by the time the beam is again on the center of the facet) and subsequently to become a progressively increasing Z axis component into the paper. Thus, the beam downstream of the hologon repetitively scans as successive facets intercept it. There is no flyback, as there is in television scanning, but there is a time when there are two output beams from the hologon. The apparatus, when used for image creation, is not useful for writing during the time when there are two beams coming from the hologon and because of this, signaling means are provided for signaling the start and finish of the useful portion of each scan line. These signaling means are well known and are not illustrated or described in detail herein. Suffice it to say that they include two sensors positioned to be impinged upon by the scanning beam just after the first beam has ceased and just before the second beam starts again, respectively. The start sensor signals the laser modulating circuitry to initiate modulation of the laser diode output and, if provided, the finish sensor could cause cessation of the modulation of the laser diode output. During the time the diode is not modulated the incoming information is temporarily stored, if the information is being supplied continuously in real time. If the information is being drawn from memory then it is drawn from memory only during the scanning of the useful portion of each scan line.

The beam leaving the hologon has a cross-sectional area much larger than is desired for the spot of light impinging on the target. The lens system 60 reduces the area of the beam to its desired value on the target and maintains focus of the spot on the planar target as the spot scans. It is commonly called an $f\theta$ lens. Such a lens system is known and further description will not be given herein.

While the desired cross-sectional area of the beam on the target can be achieved by appropriate selection of the $f\theta$ lens system 60, its shape cannot. The prismatic means 54 performs the desired change of X:Z ratio on the beam before it enters the lens system. It must be recognized that the lens system 60, in effect, transposes the X:Z dimension ratio of the beam. For example, an X:Z dimension ratio of 1:2 of the beam entering the lens system would appear as an X:Z dimension ratio of 2:1 at the target. Thus, if one wishes to increase the X:Z dimension ratio at the target, one decreases the X:Z dimension ratio between the hologon 48 and the lens system 60.

As an example, it is desired to have an X:Z dimension ratio of the spot on the target of 1.4:1 (FIG. 6d). Thus, the X:Z dimension ratio at plane 6c, i.e. the input to the lens system, should be 1:1.4. However, the X:Z dimension ratio of the beam leaving the hologon is 1:4 in order to maximize the duty cycle. The prismatic means 54 changes the beam ratio from 1:4 to 1:1.4 which is achieved by an expansion in the X direction. Thus, the prismatic means 54 performs an advantageous role in achieving the desired shape of the spot on the target 64. Without it there would have to be a compromise between optimizing spot shape on the target and optimizing duty cycle of the hologon. However, the prismatic means 54 has an undesirable effect in that it creates an X component in the beam which is dependent upon the instantaneous angular displacement of the beam axis from the Y axis. In other words, the prismatic means tends to put a bow in the path of the spot on the target. Such bow is undesirable if the apparatus is writing an image and the information in each scan line is information drawn from a straight line in the original.

In order to nullify the bow-creating tendency of the prismatic means, the beam leaving the hologon is intentionally bowed in a sense opposite to the bow created by the prismatic means and, so far as is possible, with a magnitude equal to the bow created by the prismatic means so that the path of the spot is as straight as possible.

Figure 7:
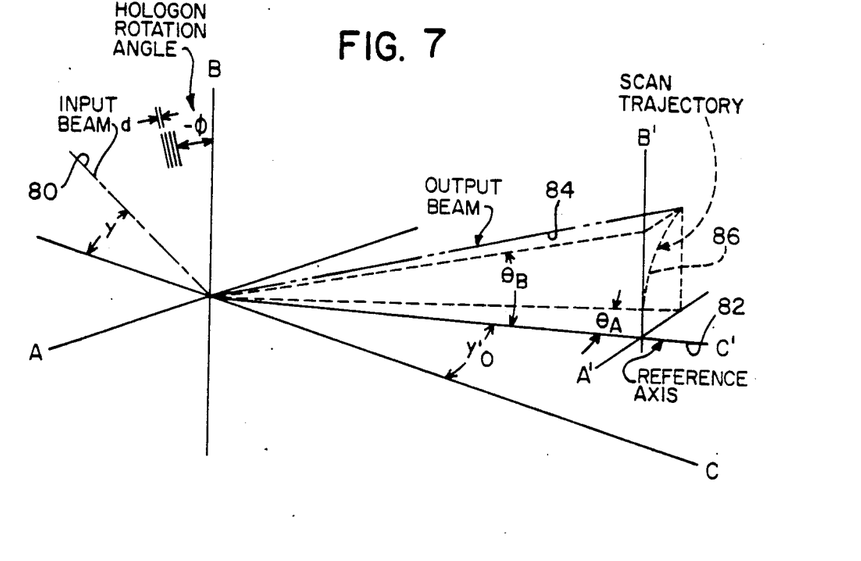
FIG. 7 represents the diffraction caused by the hologon, and a portion of the path of the scanning line.

In order to understand how the path of the scanning line immediately downstream of the hologon may have a desired bow, reference is now made to FIG. 7 which represents the diffraction caused by the hologon, and the path of the scanning line.

Because the plane of the hologon is inclined to the X and Z axes, a different system of orthogonal axes is established for this analysis.

A, B and C are orthogonal axes.

The hologon lies in the AB plane.

The input beam 80 lies in the AC plane and is inclined at angle $\gamma$ to the C axis. $\gamma$ is the incident angle.

$\phi$ is the instantaneous angle of rotation of the hologon from a condition in which the input beam is incident and centered upon a radius bisecting the facet.

82 is the output beam when $\phi = 0$ and it is in the AC plane. It is termed the reference axis following the hologon and corresponds to mid-scan location of the beam. It is inclined at angle $\gamma'_o$ to the C axis.

A' and B' are orthogonal to C', B' being parallel to B.

84 is the instantaneous output beam. It is inclined at $\theta_B$ to the A'C' plane and at $\theta_A$ to the C'B' plane.

$\theta_B$ is termed the in-track scan angle.

$\theta_A$ is termed the cross-track angle, and defines the instantaneous displacement of the spot on the target from a straight line scan. Thus, $\theta_A$ is a measure of the bow of the spot path.

86 is the scan trajectory and is the path actually followed by the spot.

The two scan components $\theta_B$ and $\theta_A$ shown in FIG. 7 are described by the expressions:

$$\theta_B = \tan^{-1} \frac{-E}{CD + AB}$$

$$\theta_A = \tan^{-1} \frac{CB - DA}{CD + AB}$$

where
$A = [\cos^2 \gamma - G^2 + 2G \sin \gamma \cos \phi]^{\frac{1}{2}}$
$B = [\cos^2 \gamma - G^2 + 2G \sin \gamma]^{\frac{1}{2}}$
$C = \sin \gamma - G \cos \phi$
$D = \sin \gamma - G$
$E = G \sin \phi$ $$G = n \frac{\lambda}{d} \text{ (the grating factor)}$$

n is the grating order number (the first diffraction order is used, therefore n = +1)
$\lambda$ is the wavelength of the radiation emitted by the diode
d is the pitch of the diffraction grating It is known that for minimum sensitivity of the system to wobble of the hologon, the angles $\gamma$ and $\gamma'$ should be equal. Therefore, the textbook grating relationship $$\sin \gamma + \sin \gamma' = \frac{n\lambda}{d}$$

becomes $$2 \sin \gamma = \frac{n\lambda}{d}$$

and hence $$\gamma = \sin^{-1} \frac{G}{2}$$

By introducing this condition for minimum wobble sensitivity into the general scan trajectory equations above, it is found that the two scan components $\theta_B$ and $\theta_A$ can be expressed as functions only of the grating factor G and the hologon rotation angle $\phi$, because $$A = \left[1 - G^2 \left(\frac{5}{4} - \cos\phi\right)\right]^{\frac{1}{2}}$$

$B = \frac{1}{2}(4 - G^2)^{\frac{1}{2}}$
$C = G(\frac{1}{2} - \cos \phi)$
$D = -\frac{1}{2} G$
$E = G \sin \phi$ The above analysis shows that a desired trajectory of the output beam can be approximated to by an appropriate choice of the grating factor G which, essentially, means by an appropriate choice of $$\frac{\lambda}{d}.$$

As the range of radiation sources available is limited, practically the selection of an appropriate grating factor comes down to a selection of the appropriate grating pitch.

Standard optical analyses may be used for designing the prisms needed to create the desired spot shape from the shape of the beam at the hologon. The bow created by the prismatic means is determined and the value of $$\frac{\lambda}{d}$$

necessary to create a compensating bow is then determined. Thus, a laser diode with a known wavelength having been selected, the grating pitch d is defined and a hologon is made with that pitch d.

With the grating factor G having been now determined the incident and diffracted angles are calculated from $$\sin \gamma + \sin \gamma' = \frac{n\lambda}{d}$$

and the system is set up with this value of incident and diffracted angle at the hologon.

In one specific embodiment of the present invention there are the following values for the various parameters:

| Hologon | |
|---|---|
| Number of facets | 18 |
| grating pitch | 0.4624 μm |
| beam input (and output) angle | 63.82° |
| diameter | 4.5 inches |
| Prism 56 | |
| refractive index | 1.1710 |
| apex angle | 30° |
| incident angle at mid scan | 59° 14' |
| Prism 58 | |
| refractive index | 1.1710 |
| apex angle | 30° |
| incident angle at mid scan | 59° 14' |
| aspect ratio of beam on the hologon | 4:1 |
| shape of spot on the target | elliptical (1:1.4) |

It will be recognized that the prismatic means between the hologon and the f$\theta$ lens would provide the same beam shaping role if they were rotated, as a unit, through 180° about an axis parallel to the Y axis. However, in this case the bow created by the prismatic means would be in the opposite sense. Thus, to counteract that bow the hologon would be so designed as to create a bow in the opposite sense. The pitch of the diffraction grating would be different and the incidence angle of the beam on the hologon would be different.

In the embodiment specifically described above, the two prisms 56 and 58 are identical. Embodiments may be constructed in which the prisms are not identical.

In the above description, mention has been made of the shape and size of the spot on the target. Those skilled in the art know that the intensity profile of the light energy in the beam where incident on the hologon is gaussian. Also, if it is assured that the beam does not fill a facet of the hologon and does not fill the fθ lens, so that there is no significant truncation of the beam, then the spot on the target also has a gaussian profile. The desired size of the spot may vary for different purposes. For example, for half-tone reproduction, the individual pixels should be distinct and this is achieved by having very little overlap of the spots creating successive pixels.

If beam expanding prismatic means are inserted between a tangential hologon and a fθ lens, beam expansion may be achieved but it is at the cost of deflection sensitivity. In other words, angular magnification is the inverse of beam expansion. Reduced deflection sensitivity would require a longer focal length fθ lens to achieve a desired length of scan line. If the same spot diameter on the target is to be achieved, a larger beam diameter at the hologon would be required. This negates the advantage of the prismatic means between the hologon and the fθ lens. However, it is a part of the present invention to discover that beam shaping along the path of the beam to optimize performance while not achievable with a tangential hologon is achievable with a radial hologon.

Figure 8:
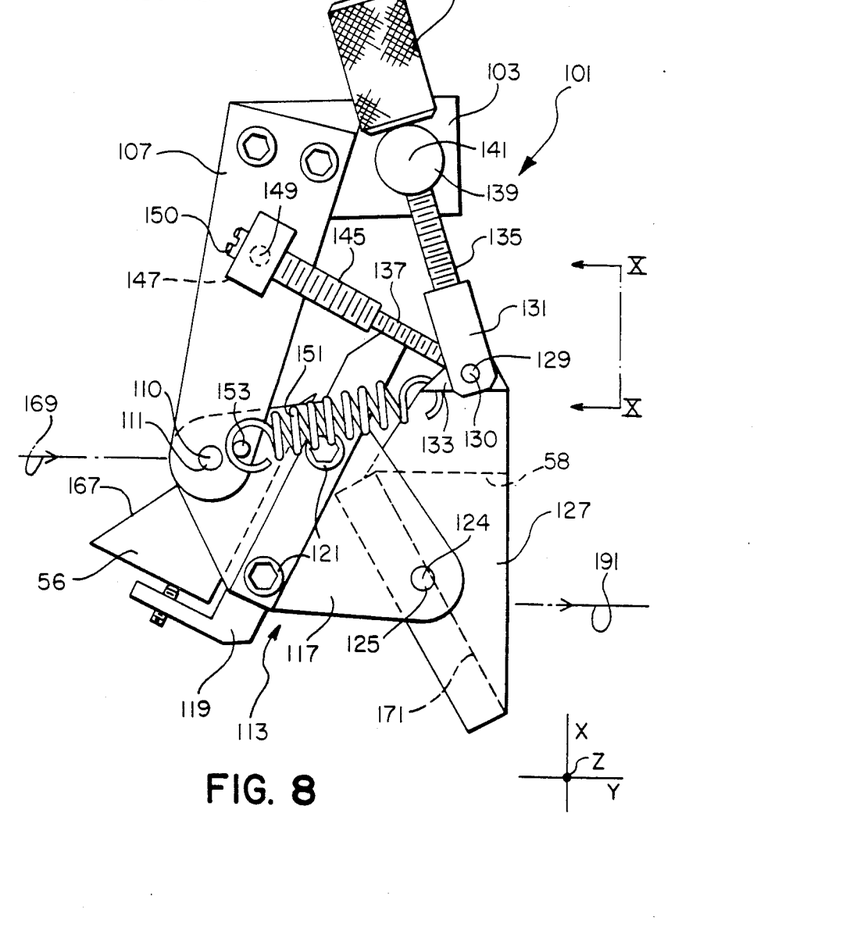
FIG. 8 is a view of one end of the articulated mount for the prismatic means illustrated in FIG. 5.
Figure 9:
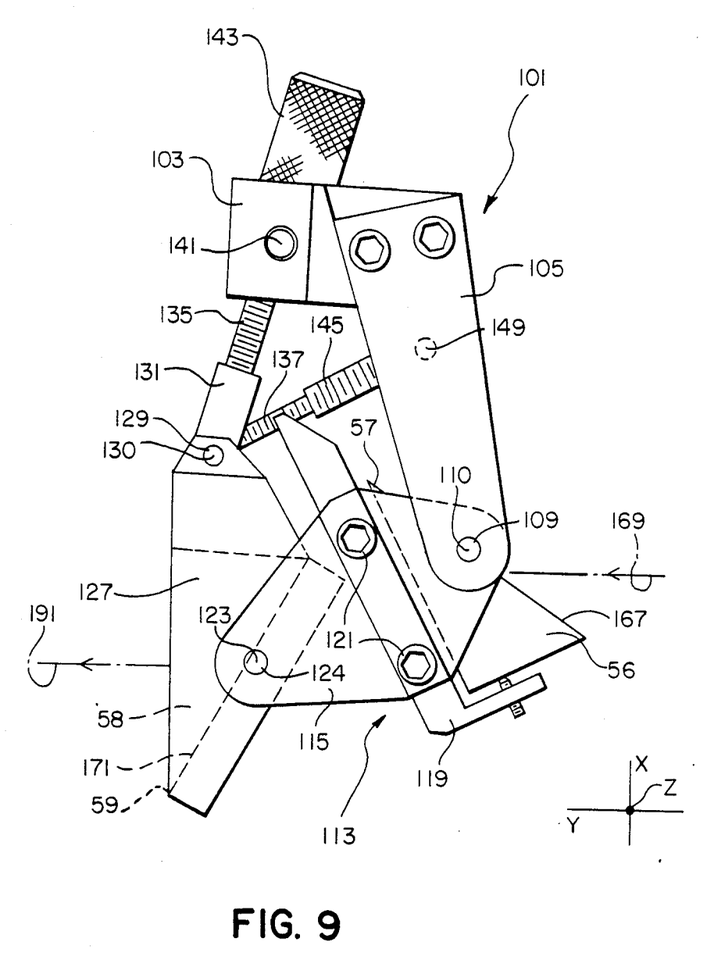
FIG. 9 is a view of the other end of the articulated mount illustrated in FIG. 8.

The two prisms are mounted in an articulated mount 101 illustrated in FIGS. 8 through 11. FIG. 9 is an end view of the mount 101 as it would be seen in FIGS. 1 and 5. FIG. 8 is the end view of the mount as it would be seen if the viewer were behind the planes of FIGS. 1 and 5 and were looking out through the paper towards the viewer of FIGS. 1 and 5.

The mount 101 includes frame members 103, 105 and 107 rigidly secured to one another and to the rigid base 22. Frame member 103 is extensive in the direction perpendicular to the planes of FIGS. 8 and 9. Frame members 105 and 107 are disposed at opposite ends of the frame member 103. Thus, the three frame members 103, 105 and 107 form a U shaped frame when viewed in a direction parallel to the Y axis.

Each of the frame members 105 and 107 carries a pivot 109, 111, respectively. The pivots 109 and 111 are aligned with one another on an axis 110 parallel to the Z axis.

The two pivots 109, 111 carry a first crib 113. The crib 113 includes end plates 115, 117 and an elongate member 119 extending between and secured to the end plates 115, 117 by screws 121.

The elongate member 119 is of L shape in cross section and has secured to it the prism 56, with the axis 110 parallel to and substantially in the plane of the entry face 167 of the prism 56.

Each of the end plates 115, 117 has a pivot 123, 125, respectively. The two pivots 123, 125 are aligned with one another on an axis 124 parallel to the axis 110 extending throughout the pivots 109, 111. The two pivots 123, 125 carry a second crib 127 in which the prism 58 is nested and to which it is secured, with the axis 124 parallel to and substantially in the plane of the entry face 171 of the prism 58.

The prisms are so disposed in their cribs that their apexes are perpendicular to the plane containing the input beam 169 and the output beam 191 (see FIGS. 8 and 9) at mid scan.

Figure 10:
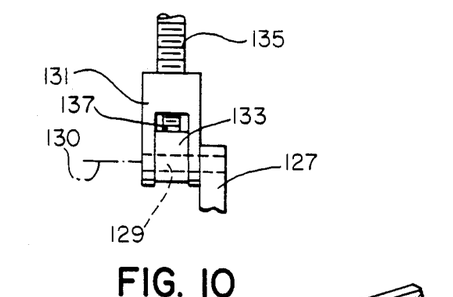
FIG. 10 is a scrap view of a portion of the articulated mount, taken on the line XI—XI in FIG. 9.

At one end, the crib 127 has a pivot 129 having an axis 130 and on which is pivoted a clevis 131 and a bearing member 133 situated between the arms of the clevis, as can be seen in FIG. 10. The clevis 131 has integral with it a threaded shaft 135 and the bearing member 133 has integral with it a short threaded shaft 137.

The shaft 135 extends through a reaction member 139 which is pivotally mounted on the frame member 103 for pivotal motion about axis 141. A knurled nut 143 is threadedly engaged on the shaft 135 at the side of the reaction member 139 away from the clevis 131.

The shaft 137 is telescopically and threadedly engaged within an internally threaded tubular shaft 145 which is also externally threaded. The external threads on the shaft 145 have the same hand as the threads on the shaft 137, but different pitch. The shaft 145 extends through a screwthreaded bore in a reaction member 147 which is pivotally mounted on the frame member 107 for pivotal movement about an axis 149. The shaft 165 has a screwdriver slot 150 at its free end to enable it to be turned.

A tension spring 151 extends between the bearing member 133 and an anchor point 153 on the frame member 107. The spring 151 serves to keep the knurled nut 143 butted against the reaction member 139 by providing a clockwise torque about axis 149, as seen in FIG. 8.

Figure 11:
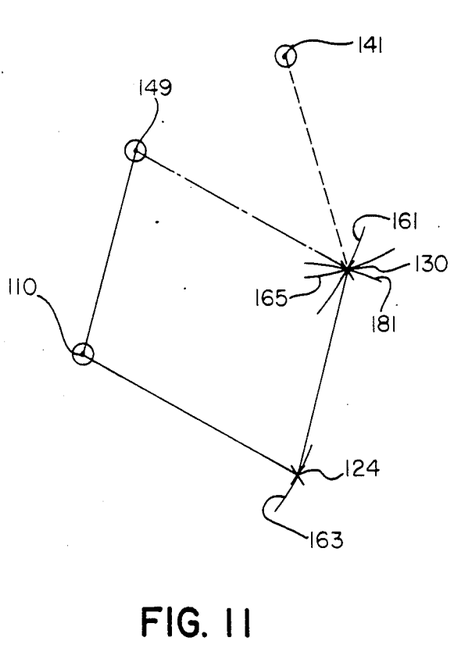
FIG. 11 is a schematic representation of the articulation of the mount illustrated in FIGS. 8, 9 and 10.

Reference is now made to FIG. 11 which is a representation of the relative locations of the pivot axes 110, 126, 130, 149 and 161, as seen in FIG. 8. In FIG. 11 the solid lines between pairs of axes 149 and 110; 110 and 124; and 124 and 130, indicate that the distances between the members of each pair are fixed. The chain line between axes 130 and 149, and the broken line between axes 130 and 141, indicate that the distances between the members of each of these two pairs of axes are variable, in fact by rotation of the shaft 145 or of the knurled nut 143, respectively. However, when the shaft 145 is turned the distance between axes 141 and 130 remains constant, and when knurled nut 143 is turned the distance between axes 149 and 130 remains constant.

The distance between axes 110 and 149 and the distance between axes 124 and 130 are the same. The distance between axes 110 and 124 and the distance between axes 130 and 149 when the axis 130 is at the middle of its normal operating range of positions relative to axis 149, are equal.

The axes 141, 149 and 110 are fixed in space, as is indicated by circles around them in FIG. 11. The axes 126 and 130 are movable in space, as indicated by the X through each of them in FIG. 11.

If broken line side 130–141 is varied in length by turning knurled nut 143, then axis 130 moves over arc 161 struck about axis 149 and, consequently, axis 126 moves over arc 163 struck about axis 110. Under these circumstances, the axes 110, 124, 130, 149 retain their relationship as corners of a parallelogram relationship.

If chain line side 130–149 is varied in length by rotating shaft 145, the axis 130 moves over arc 165 struck about axis 141.

When the knurled nut 143 is rotated, the prism 56 rotates about axis 110 which is parallel to the entry face 167 of the prism 56 and disposed approximately in the plane of the entry face. At the same time the prism 58 is not subjected to any rotation about axis 124 relative to the frame 103, 105, 107, assuming that the distance between axes 130 and 169 is equal to distance between axes 110 and 124 and that the articulation arrangement is, therefore, performing exactly as a parallelogram. If the distance between axes 130 and 149 is off equality with the distance between axes 124 and 110, then the prism 58 would perform some small amount of pivoting. Thus, in the ideal situation, the prism 58 is translated in a direction with a major component parallel to the Y axis, without rotation. However, there is relative rotational movement of the prisms relative to one another. This has the desired effect of changing the bow imposed on the scanning beam by the pair of prisms, so that an undesired change in the bow of the scanning beam leaving the hologon, due to a departure of the grating factor from nominal, or from a previous condition in which the system has been optimized, is corrected.

Rotation of the prism 56 about the axis 110 causes a change in the angle between the beam input to the prism 56 and the beam output from the prism 56. If the second prism 58 remained stationary, the change in the output angle of the beam from the prism 56 would result in the scanning beam being incident on a different portion of the entry face 171 of the prism 58. Absent the translational movement of the prism 58 accompanying the rotational movement of the prism 56, the prism 58 would have to be so large as to accommodate all possible entry locations of the scanning beam. It will be recognized that the beam is not a point, it has a finite dimension in the X direction. Also the path of the scanning beam entering the prism 58 is not rectilinear, it is bowed. However, the translational movement of the prism 58 allows the entry location of the scanning beam to remain approximately constant. Thus, the prism 58 may be smaller than would be the case absent the translational movement upon rotation of nut 143. This allows a substantial saving in cost of the prism 58. Also, because the prism 58 may be smaller, the distance between the hologon 48 and the lens system 60 may be kept small with consequential savings in cost of the lens system. It will be recognized that because the beam between the hologon and the lens system is scanning, the further the lens system is from the hologon the larger its diameter has to be.

The change in angle of incidence of the beam on the second prism 58 causes a change in the exit angle, i.e. no longer will the beam 191 output from prism 58 be parallel to the beam 169 input to the prism 56. This results in a change in the location of the scan line on the target, which is undesirable. This undesirable change can be corrected by rotation of the shaft 145 by putting a screwdriver in the slot 150 and rotating it. This causes movement of the pivot axis 130 over the arcuate path 165. Such movement of the pivot axis 130 causes a rotational movement of the prism 58 about pivot axis 124. As a result of such movement, the axis 124 does not stay quite stationary so there is some small displacement of the prism 56. This can be overcome by an interactive process. The desired rotational movement of prism 58 causes a change in the output angle of the beam and hence the scan line on the target can be brought back to its desired location.

It will be recognized that if rotational movement of prism 58 were to be achieved without any movement of the prism 56 then the pivot axis 130 would have to be moved over the arc 181 in FIG. 11. It will be observed that over a small range the arc 171 approximates the path 165. Closer approximation of the arc 165 to the arc 181, over the normal operating range, would be achieved if the axis 141 were to be disposed on a line extending through both the axes 124 and 130. However, a review of FIG. 8 will show that if the axis 141 were to be put in such a location the articulated mount would be larger in the direction of the Y axis. That increased size would require a greater distance between the hologon and the lens system which would require a larger and undesirably more expensive lens system.

What is claimed is:

1. Scanning apparatus for scanning a radiation spot along a substantially straight line at a predetermined position on a target, comprising:
   a source of coherent radiation having a wavelength $\lambda$;
   a radial hologon mounted for rotation about an axis and having at least one pattern of parallel grating lines with a pitch d;
   means for forming radiation from said source into a collimated beam and for directing said beam onto the hologon at a predetermined incident angle;
   a target station for receiving the scanned beam;
   lens means between the hologon and the target station for focusing the beam to a spot at the target station; and
   prismatic means between the hologon and the lens means for modifying the cross-sectional shape of the beam;
   the wavelength of the radiation and the grating factor $$\frac{n\lambda}{d}$$

(wherein n is the grating order number) of the hologon being selected to produce a bow in the scanned beam between the hologon and the prismatic means approximately equal and opposite to the bowing tendency imposed by the prismatic means on the scanned beam whereby the scan line at the imaging station is substantially straight;
   said prismatic means including first and second prisms so disposed that the beam passes through them in succession, the apexes of said prisms being perpendicular to a plane containing the beam input to said prisms and the beam output from said prisms at mid scan;
   an articulated mount carrying said prisms including a first pivot associated with said first prism and a second pivot associated with said second prism, the axes of said pivots being parallel to the apexes of said prisms;
   each of said pivots allowing pivoting movement of its associated prism about the axis of the pivot;
   first means for adjusting the orientation of the first prism about the first pivot axis to adjust the shape of the line on the target; and
   second means for adjusting the orientation of said second prism about the second pivot axis for adjusting the position of the line on the target.

2. Scanning apparatus as claimed in claim 1, including means for moving said second prism translationally upon pivoting movement of said first prism about its associated pivot axis whereby the beam is incident upon said second prism at approximately the same location after pivoting movement of the first prism as before.

3. Scanning apparatus as claimed in claim 1, wherein the axis of said first pivot is substantially in the plane of the input face of said first prism; and
the axis of said second pivot is substantially in the plane of the input face of said second prism.

* * * * *